(Model.)

A. QUIMBY.
SASH FASTENER.

No. 252,138.    Patented Jan. 10, 1882.

Witnesses;
Henry Robinson
Charles A. Bond

Inventor;
Alfred Quimby

UNITED STATES PATENT OFFICE.

ALFRED QUIMBY, OF BOW, NEW HAMPSHIRE.

SASH-FASTENER.

SPECIFICATION forming part of Letters Patent No. 252,138, dated January 10, 1882.

Application filed March 30, 1881. (Model.)

*To all whom it may concern:*

Be it known that I, ALFRED QUIMBY, a citizen of the United States, residing at Bow, in the county of Merrimack and State of New Hampshire, have invented certain new and useful Improvements in Window-Sash Locks; and I do hereby declare that the following is a full, clear, and exact description of the same, reference being had to the accompanying drawings, in which—

Figure 1:
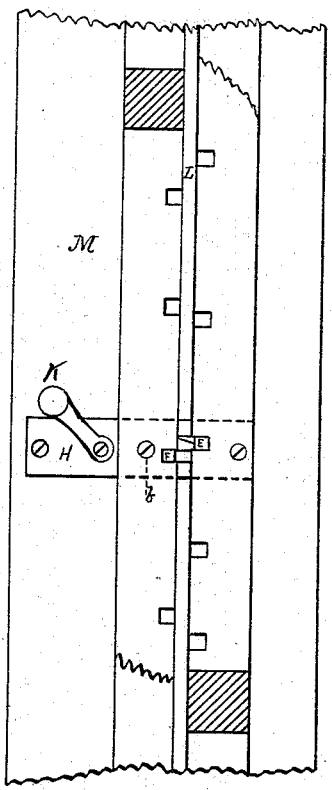
Figure 2:
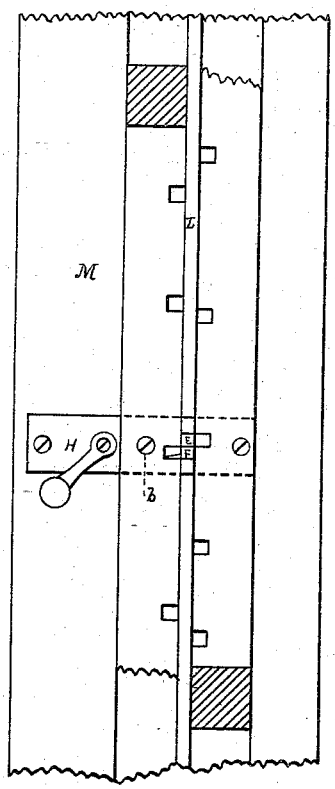
Figure 3:
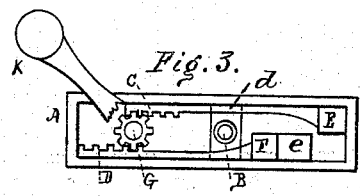
Figure 4:
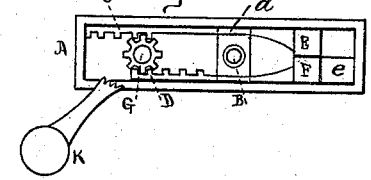
Figure 5:
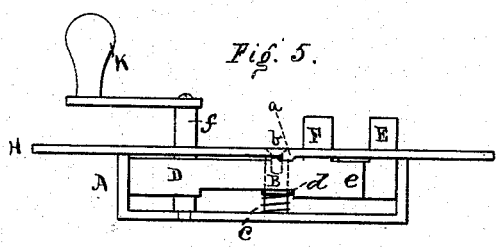
Figure 6:
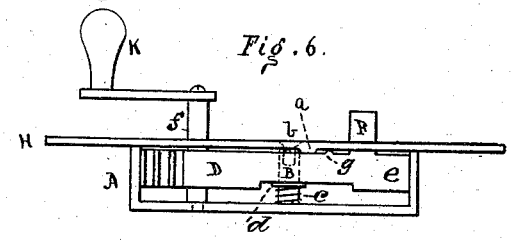

Figure 1 is a side elevation of the locking device, showing the sashes in a locked position. Fig. 2 is a similar view with the bolts drawn back so as to leave the sashes unlocked. Fig. 3 is a front view of the interior mechanism with face-plate removed, showing the bolts in position when locked. Fig. 4 is a similar view with the bolts drawn back. Fig. 5 is a sectional side elevation with the bolts in position, as illustrated in Fig. 3; and Fig. 6 is a similar view with the bolts in position, as shown in Fig. 4.

The present invention has relation to certain new and useful improvements in that class of sash locks or fasteners in which two bolts are employed, operated simultaneously to lock or unlock the window-sashes by a simple pinion engaging with teeth upon the shanks of the bolts, or by other similar means.

The object of the invention is to provide a simple and effective device of the above-mentioned character, whereby the sashes of weighted windows may be securely locked in an opened or closed position, as circumstances require, and also prevent the windows from rattling, which objects I attain by the construction substantially as shown in the drawings, and hereinafter described.

In the accompanying drawings, A represents a casing of metal, and of rectangular form, having within its interior a post, B, formed with an axial screw-hole to receive a screw, $b$, for attaching to said casing a suitable face-plate, H.

Around the post B is coiled a spring, $c$, upon which rests a square or other form of washer, $d$, said washer passing over the end of the post B.

Within the casing A are located two movable racks, C D, which rest on the washer $d$ upon each side of the post B. These racks C D are each provided respectively with bolts E F, which project at right angles to said racks, and are of sufficient length to secure the sash when placed in the required position. The rack D at one end extends beyond the bolt F to form a stop, $e$, its length being equal to the thickness of the bolt E. The teeth upon the racks C D engage with those upon a suitable pinion, G, formed with or connected to shaft $f$, which has its bearings in the face-plate H and bottom of the casing A.

Through the face-plate H are two slots, through which the ends of the bolts E F project, and are of sufficient length to allow the requisite forward and backward movement of the bolts in locking and unlocking.

On the under side of the face-plate H is a lug, $a$, and a similar lug, $g$, on the top of each of the racks C D, so that by means of the spiral spring $c$ the racks are prevented from accidentally changing their position, the lugs $a$ $g$, together with the spring $c$, being considered important and essential to the practical and successful operation of the bolts.

The shaft $f$ is provided with a suitable handle for operating it, as shown at K; or any other convenient means may be employed for turning the pinion G, such as a key.

The device is fitted in place for use by cutting a slot crosswise in the window-frame at the point where the top of the bottom sash and the bottom of the top sash overlap.

For the reception of the box or casing A the face-plate H is sunk flush with the frame, and the parting-bead (represented at L, Figs. 1 and 2) between the two sashes is cut through and removed at that point.

The pinion G being turned so that the bolts E F are in position, as shown in Fig. 4, the bolts should be in line with the parting-bead L and the face plate screwed to the frame.

The shaft $f$ projects through the stop-bead M on the inside of the window, so as to be operated by the crank K, which may be permanently attached thereto or removable, leaving the shaft to be operated by a key. Slots are then cut in the inside of the upper sash and the outside of the lower sash at points opposite the bolts E F, respectively, when the windows are closed, and other slots are cut at any desired distances for receiving the bolts and locking the window at those points when the sash is brought in such position that the slots are opposite the bolts.

The spring $c$ retains the racks C D, with their bolts E F, in an elevated position, as shown in Figs. 5 and 6, so as to prevent the lugs $g$ from passing under the lugs $a$, the latter acting as a stop, thereby preventing the possibility of their moving in the direction and beyond the lug $a$ by any ordinary rattling of the sash, as the lugs $g$ bear against the side of the lug $a$. Now, it should be noticed that both the lugs $a\,g$ have beveled sides, as is fully shown in Figs. 5 and 6, and, as before stated, the spring $c$, pressing upward as it does, prevents the lugs $g$ from dropping low enough to slide under and pass the lug $a$; but when it is desired to move the bolts, by turning the handle K a sufficient direct power is obtained to cause the inclined sides of the lugs $g$ to slip against the opposite inclined side of the lug $a$, and press downward upon the spring $c$ until the lugs $g$ can pass under the lug $a$, when the spring immediately pushes the lugs $g$ upon the other side of the lug $a$ and holds it in position, the opposite inclined sides of the lugs $g$ on the bolts or racks thereof and the inclined side on the lug $a$ of the face-plate are held in contact, and the bolts are prevented from moving by extraneous causes, the same as when in the first position.

Having now fully described my invention, what I claim as new, and desire to secure by Letters Patent, is—

In a sash-lock, the casing A and face-plate H, having upon its under side the inclined lug $a$, in combination with a suitable spring, $c$, and racks C D, formed with bolts E F and inclined lugs $g$, the racks provided with means for operating them, substantially as and for the purpose set forth.

ALFRED QUIMBY.

Witnesses:
HARRY M. CAVIS,
WELLS H. JOHNSON.